(12) United States Patent
Sharpley et al.

(10) Patent No.: US 10,307,029 B2
(45) Date of Patent: Jun. 4, 2019

(54) VACUUM CLEANER HAVING A FILTER ASSEMBLY

(71) Applicant: Dyson Technology Limited, Wiltshire (GB)

(72) Inventors: Rowan John Sharpley, Gloucester (GB); Michael Philip Day, Seattle, WA (US); Glyn Geoffrey Rees-Jones, Bath (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 88 days.

(21) Appl. No.: 15/464,718

(22) Filed: Mar. 21, 2017

(65) Prior Publication Data
US 2017/0265698 A1    Sep. 21, 2017

(30) Foreign Application Priority Data
Mar. 21, 2016    (GB) .................... 1604735.9

(51) Int. Cl.
  *B01D 46/10*    (2006.01)
  *B01D 46/52*    (2006.01)
  *B01D 46/00*    (2006.01)
  *F02M 35/024*   (2006.01)
  (Continued)

(52) U.S. Cl.
  CPC .............. *A47L 9/12* (2013.01); *A47L 9/0081* (2013.01); *A47L 9/122* (2013.01);
  (Continued)

(58) Field of Classification Search
  CPC .. B01D 46/0005; B01D 46/521; B01D 46/10; B01D 46/52; B01D 46/00; B60H 1/00849; F02M 35/024
  (Continued)

(56) References Cited

U.S. PATENT DOCUMENTS 5,643,079 A * 7/1997 Miyata ............... B60H 1/00849
                                                  454/134
5,679,122 A * 10/1997 Moll .................. B01D 46/0005
                                                  210/493.3
(Continued)

FOREIGN PATENT DOCUMENTS

DE    199 25 227    12/1999
EP    0 910 980     4/1999
(Continued)

OTHER PUBLICATIONS

Search Report dated Sep. 20, 2016, directed to GB Application No. 1604735.9; 1 page.

*Primary Examiner* — Amber R Orlando
*Assistant Examiner* — Minh Chau T Pham
(74) *Attorney, Agent, or Firm* — Morrison & Foerster LLP

(57) ABSTRACT

A vacuum cleaner that includes a suction motor and a filter assembly. The filter assembly surrounds at least part of the suction motor and has a frame to which a filter medium is attached. The filter medium is spaced from a wall of the frame such that an arcuate passageway is defined between the filter medium and the frame. A part of the air expelled by the suction motor enters a first end of the passageway and moves around the passageway in a clockwise direction. A further part of the air expelled by the suction motor enters a second end of the passageway and moves around the passageway in a counter-clockwise direction. Air within the passageway then passes through the filter medium.

10 Claims, 7 Drawing Sheets

(51) Int. Cl.
*A47L 9/12* (2006.01)
*A47L 9/00* (2006.01)

(52) U.S. Cl.
CPC ........ *B01D 46/0005* (2013.01); *B01D 46/521* (2013.01); *B01D 2279/55* (2013.01)

(58) Field of Classification Search
USPC ......... 55/498, 483, 510, 502, 497, 506, 505, 55/521, 495, 422, 493, 529, 395.3; 95/273; 210/497.01, 497.1, 167.12
See application file for complete search history.

(56) References Cited

U.S. PATENT DOCUMENTS

| | | | | |
|---|---|---|---|---|
| 6,422,197 | B1* | 7/2002 | Amann | ................ F02M 35/024 |
| | | | | 123/198 E |
| 6,948,211 | B2 | 9/2005 | Stephens et al. | |
| 7,942,947 | B2* | 5/2011 | Yamamoto | ........... B01D 46/521 |
| | | | | 123/198 E |
| 8,197,570 | B2* | 6/2012 | Morgan | ............. B01D 46/0005 |
| | | | | 210/167.12 |
| 2005/0022337 | A1 | 2/2005 | Roney et al. | |
| 2007/0050939 | A1 | 3/2007 | Dant et al. | |
| 2011/0219579 | A1 | 9/2011 | Conrad | |

FOREIGN PATENT DOCUMENTS

| | | |
|---|---|---|
| EP | 1 474 025 | 11/2006 |
| EP | 1 656 061 | 11/2011 |
| EP | 2 581 017 | 4/2013 |
| GB | 343894 | 2/1931 |
| JP | 60-24258 | 2/1985 |
| JP | 3-182223 | 8/1991 |
| WO | WO-00/66247 | 11/2000 |

* cited by examiner

VACUUM CLEANER HAVING A FILTER ASSEMBLY

REFERENCE TO RELATED APPLICATION

This application claims the priority of United Kingdom Application No. 1604735.9, filed Mar. 21, 2016, the entire contents of which are incorporated herein by reference.

FIELD OF THE INVENTION

The present invention relates to a vacuum cleaner having a filter assembly.

BACKGROUND OF THE INVENTION

A vacuum cleaner may have a filter located downstream of the suction motor, which removes residual dirt from the air before being expelled from the vacuum cleaner. Unfortunately, the filter is often small and offers poor filtration or the filter is large and impacts significantly on the size of the vacuum cleaner.

SUMMARY OF THE INVENTION

According to some embodiments, the present invention provides a vacuum cleaner comprising a suction motor and a filter assembly, wherein the filter assembly surrounds at least part of the suction motor and comprises a frame to which a filter medium is attached, the filter medium is spaced from a wall of the frame such that an arcuate passageway is defined between the filter medium and the frame, a part of the air expelled by the suction motor enters a first end of the passageway and moves around the passageway in a clockwise direction, a further part of the air expelled by the suction motor enters a second end of the passageway and moves around the passageway in a counter-clockwise direction, and air within the passageway passes through the filter medium.

By employing a filter assembly that surrounds a part of the suction motor, relatively good filtration may be achieved in a relatively compact manner. In particular, a filter medium having a relatively large surface area may arc around the suction motor. Employing a filter assembly having an arcuate filter medium is not without its difficulties. In particular, air passing through the filter assembly may be poorly distributed over the filter medium. This uneven loading lowers the dirt capacity of the filter medium and thus the filter medium must be replaced or washed more frequently. The filter assembly of the present invention addresses this problem by having an arcuate passageway into which air from the suction motor enters before passing through the filter medium. Importantly, part of the air expelled from the suction motor enters a first end of the passageway and moves around the passageway in a clockwise direction, and a further part of the air enters a second end of the passageway and moves around the passageway in a counter-clockwise direction. As a result, relatively good loading of the filter medium may be achieved.

The size of the passageway (i.e. the cross-sectional area of the passageway in the plane normal to the centreline of the passageway) at each end of the passageway may be larger than that at the midpoint of the passageway. If the size of the passageway were constant along its length, the pressure within the passageway would decrease progressively from each end of the passageway towards the midpoint. As a result, the flow rate of air passing through the filter medium, and thus the loading of the filter medium, would be highest at each end of the passageway and would decrease progressively towards the midpoint. By ensuring that the size of the passageway is smaller at the midpoint, a higher pressure may be achieved at the midpoint and thus improved loading of the filter medium may be achieved. More particularly, the size of the passageway may decrease progressively from each end of the passageway towards the midpoint of the passageway. As a result, a more even pressure may be achieved along the length of the passageway, and thus a more even loading of the filter medium may be achieved.

The change in the size of the passageway may be achieved by changes in the width of the passageway, i.e. the width of the passageway at each end may be greater than that at the midpoint, or the width of the passageway may decrease progressively from each end to the midpoint. This then has the advantage that changes in the size of the passageway may be achieved without or with relatively little change in the height of the passageway, and thus without or with relatively little change in the area of the filter medium that is exposed to the air. Indeed, the height of the passageway may be constant such that changes in the size of the passageway are achieved without any change in the exposed area of the filter medium.

The frame may comprise an inlet, a first duct that connects fluidly the inlet to the first end of the passageway, and a second duct that connects fluidly the inlet to the second end of the passageway. This then has the advantage of simplifying the ducting and sealing arrangement between the suction motor and the filter assembly. In particular, the suction motor may have a single outlet that is coupled to the inlet of the frame by means of a single seal.

The filter assembly may be configured such that air expelled from the suction motor enters the filter assembly in a first direction, and air passes through the filter medium in a second direction normal to the first direction. This then enables the suction motor and the filter assembly to be arranged a relatively compact manner For example, the filter assembly may surround an upper part or a lower part of the suction motor and may have an inner perimeter that is smaller than the maximum outer perimeter of the suction motor.

The vacuum cleaner may comprise a cable reel unit that surrounds a lower part of the suction motor, and the filter assembly may surround an upper part of the suction motor. As a result, a relatively compact arrangement may be achieved.

BRIEF DESCRIPTION OF THE DRAWINGS

In order that the present invention may be more readily understood, an embodiment of the invention will now be described, by way of example, with reference to the accompanying drawings in which.

DETAILED DESCRIPTION OF THE INVENTION

Figure 1:
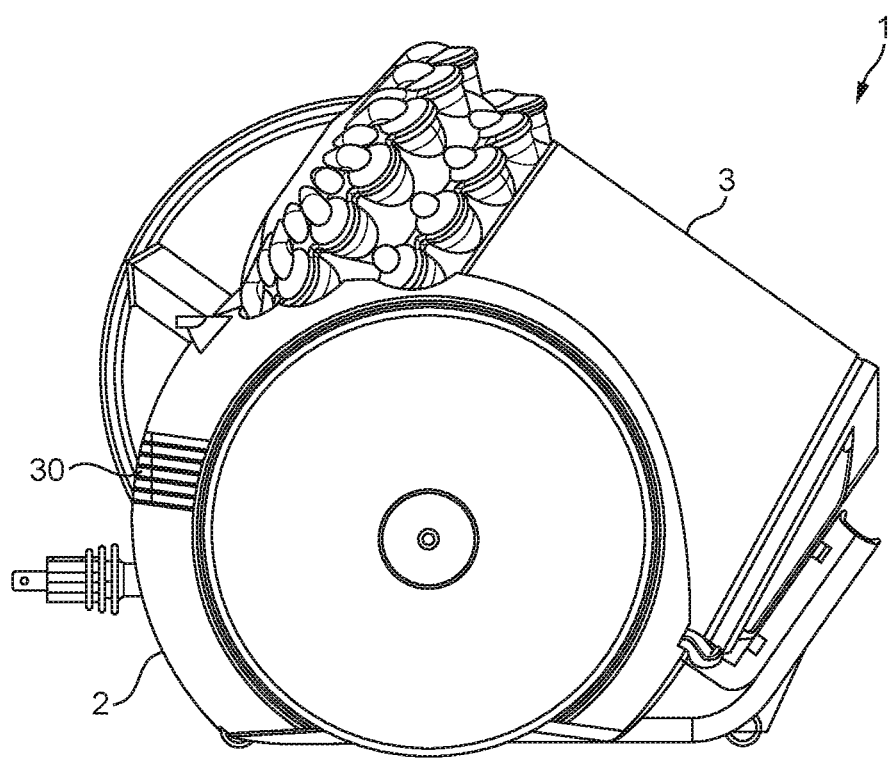
FIG. 1 is a side view of a vacuum cleaner in accordance with the present invention.
Figure 2:
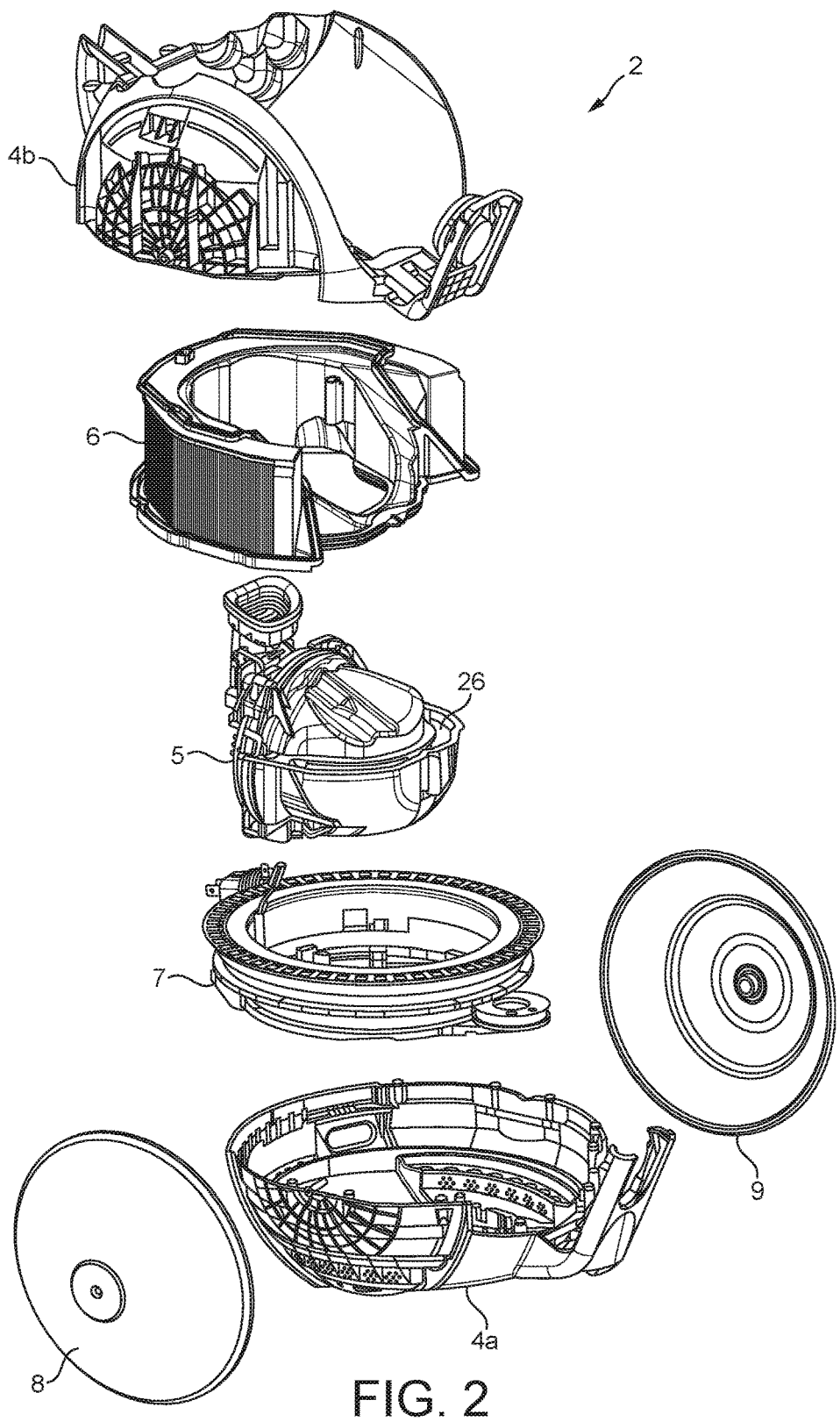
FIG. 2 is an exploded view of the main body of the vacuum cleaner.
Figure 3:
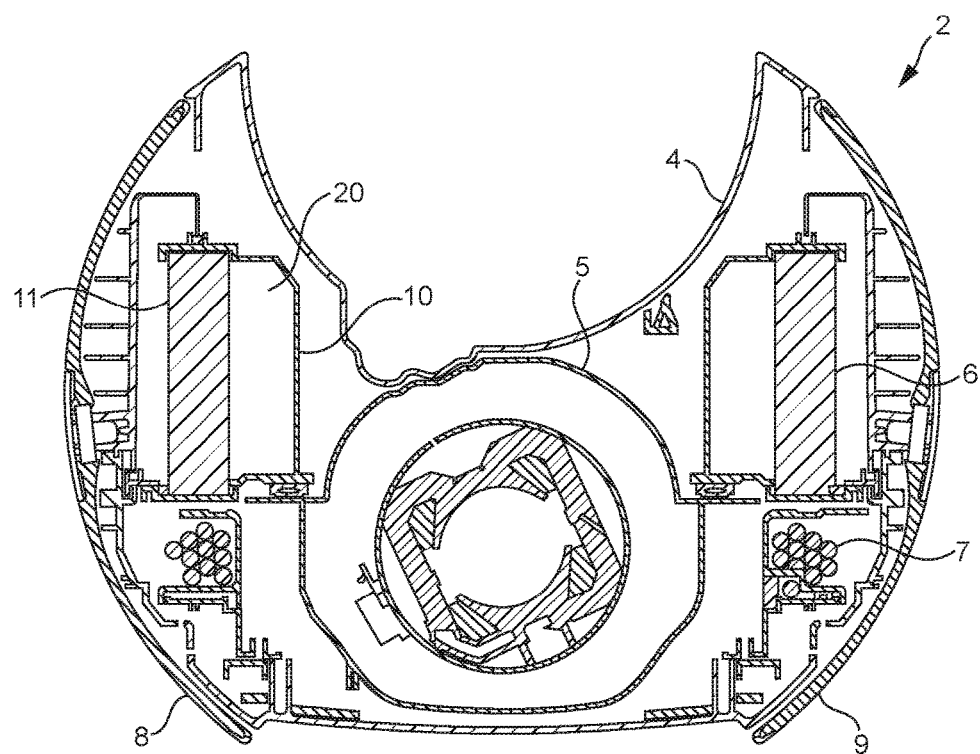
FIG. 3 is a front view of a vertical slice through the main body.
Figure 4:
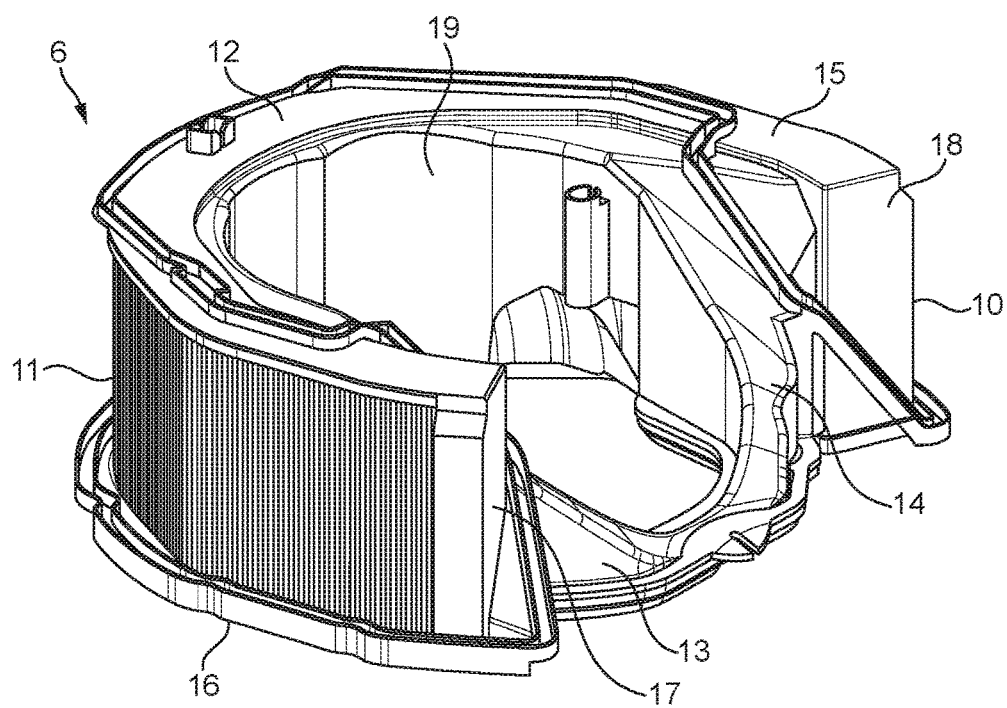
FIG. 4 is a perspective view of the filter assembly of the vacuum cleaner.
Figure 5:
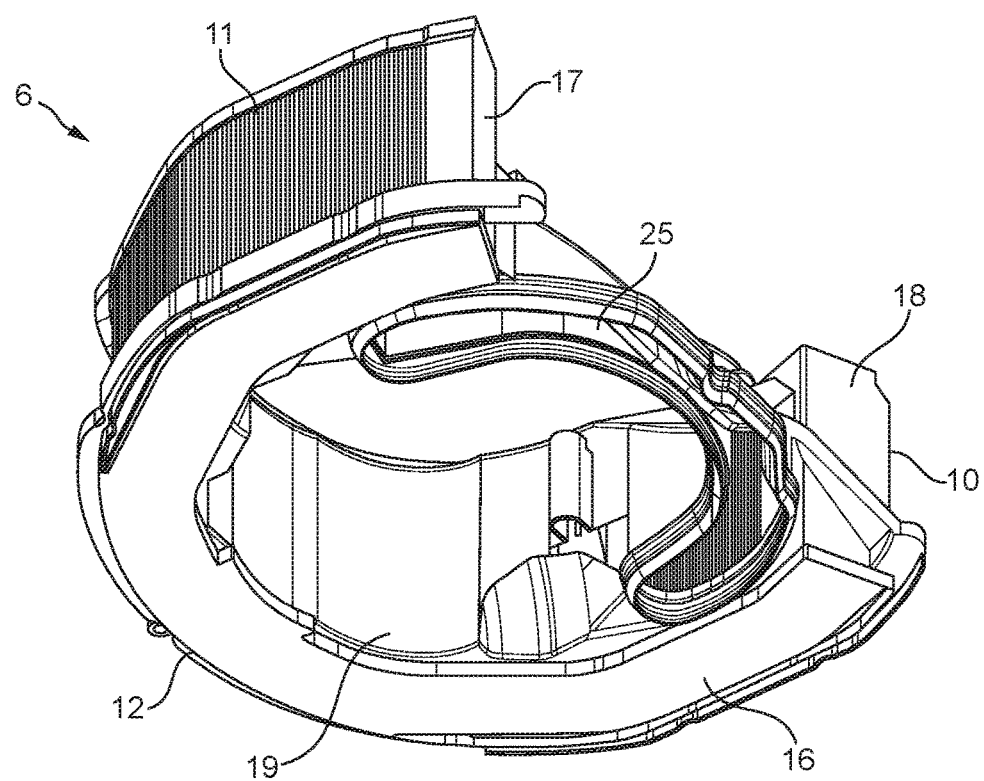
FIG. 5 is a further perspective view of the filter assembly.

The vacuum cleaner 1 of FIGS. 1 to 3 comprises a main body 2 to which a dirt separator 3 is removably attached. The main body 2 comprises a housing 4, a suction motor 5, a filter assembly 6, a cable reel unit 7, and a pair of wheels 8,9. The suction motor 5, the filter assembly 6 and the cable reel unit 7 are located inside the housing 4. The wheels 8,9, on the other hand, are attached to the outside of the housing 4 on opposite sides. The suction motor 5 is located roughly at the centre of the housing 4. The cable reel unit 7 is located in a lower part 4a of the housing 4 and surrounds a lower part of the suction motor 5. The filter assembly 6 is located in an upper part 4b of the housing 4 and surrounds an upper part of the suction motor 5.

Referring now to FIGS. 4 to 7, the filter assembly 6 comprises a frame 10 to which a filter medium 11 is attached. The frame 11 comprises an arcuate section 12 and a pair of ducts 13,14. The arcuate section 12 comprises a top wall 15, a bottom wall 16, two end walls 17,18, and an inner side wall 19. The filter medium 11 is then attached to the arcuate section 12 of the frame 10 between the top wall 15 and the bottom wall 16. The filter medium 11 is spaced from the side wall 19 such that an arcuate passageway 20 is defined between the frame 10 and the filter medium 11. More particularly, the arcuate passageway 20 is bounded along its length by the top wall 15, the bottom wall 16, the side wall 19 and the filter medium 11.

Each of the ducts 13,14 is attached at one end to the arcuate section 12 and at the opposite end to the other of the ducts 14,13. As a result, the frame 10 forms an enclosed ring. The ducts 13,14 are attached to the arcuate section 12 such that each duct 13,14 opens into an end 21,22 of the arcuate passageway 20. The ducts 13,14 are attached to one another so as to define a single downwardly directed inlet 25. Each duct 13,14 therefore connects fluidly the inlet 25 to an end 21,22 of the arcuate passageway 20.

Figure 6:
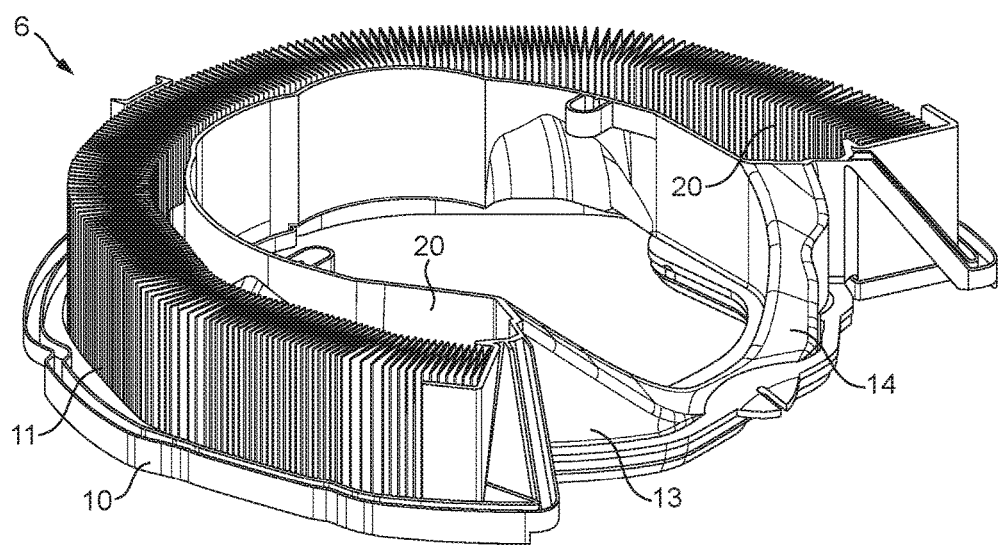
FIG. 6 is a perspective view of a horizontal section through the centre of the filter assembly.
Figure 7:
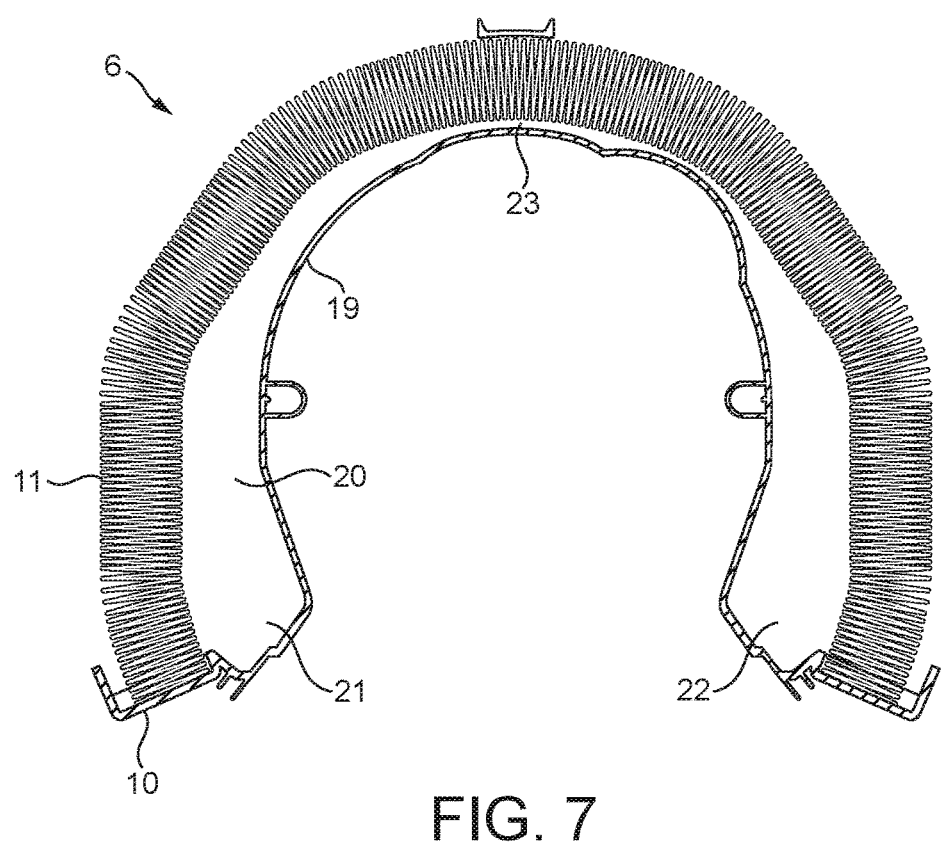
FIG. 7 is a plan view of a horizontal slice through the centre of the filter assembly.

As illustrated in FIGS. 6 and 7, the size of the arcuate passageway 20 (i.e. the cross-sectional area of the passageway 20) decreases progressively from each end 21,22 of the passageway 20 to the midpoint 23 of the passageway 20. More particularly, the width of the passageway 20 (i.e. the distance between the side wall 19 of the frame 10 and the filter medium 11) decreases progressively from each end 21,22 of the passageway 20 to the midpoint 23. The advantages of this are described below.

During use of the vacuum cleaner 1, the suction motor 5 draws air through the dirt separator 3 and into the suction motor 5. The air expelled by the suction motor 5 enters the filter assembly 6 via the inlet 25 in the frame 10. The air then divides in two with a first part of the air passing through one of the ducts 13, and a second part of the air passing through the other of the ducts 14. The first part of the air enters a first end 21 of the arcuate passageway 20 and moves around the passageway 20 in a clockwise direction. The second part of the air enters a second end 22 of the arcuate passageway 20 and moves around the passageway 20 in a counter-clockwise direction. The air within the passageway 20 then passes through the filter medium 11, and is expelled from the vacuum cleaner 1 via vents 30 in the housing 4.

By employing a filter assembly 6 that surrounds the suction motor 5, relatively good filtration may be achieved in a relatively compact manner In particular, by arcing the filter medium 11 around the suction motor 5, a relatively large surface area may be achieved for the filter medium 11 without unduly increasing the size of the housing 4. Employing an arcuate filter medium 11 is not, however, without its difficulties. In particular, air passing through the filter assembly 6 may be poorly distributed over the filter medium 11. As a result, dirt is deposited unevenly over the filter medium 11. This uneven loading lowers the dirt capacity of the filter medium 11 and thus the filter medium 11 must be replaced or washed more frequently. The filter assembly 6 addresses this problem by having an arcuate passageway 20 into which air from the suction motor 5 enters before passing through the filter medium 11. Importantly, part of the air expelled by the suction motor 5 enters a first end 21 of the passageway 20 and moves around the passageway 20 in a clockwise direction, and a further part of the air enters a second end 22 of the passageway 20 and moves around the passageway 20 in a counter-clockwise direction. As a result, relatively good loading of the filter medium 11 can be achieved.

The size of the arcuate passageway 20 is not constant but instead decreases progressively from each end 21,22 of the passageway 20 to the midpoint 23 of the passageway 20. If the size of the passageway 20 were constant along its length then, as the air moves along the passageway 20 and passes through the filter medium 11, the pressure of the air within the passageway 20 would decrease progressively from each end 21,22 of the passageway 20. As a result, the flow rate of air passing through the filter medium 11, and thus the loading of the filter medium 11, would be highest at each end 21,22 of the passageway 20 and would decrease progressively towards the midpoint 23. By ensuring that the size of the passageway 20 decreases progressively from each end 21,22 to the midpoint 23 of the passageway 20, a more even pressure may be achieved along the length of the passageway 20, and thus a more even loading of the filter medium 11 may be achieved.

In spite of the advantages, the filter assembly 11 may be configured such that the size of the arcuate passageway 20 does not decrease progressively. For example, the size of the passageway 20 may be constant along its length. Whilst loading of the filter medium 11 is then likely to be uneven, the filter assembly 6 would still continue to provide significant benefits. In particular, the filter assembly 6 would continue to provide relatively good filtration in a relatively compact manner, and relatively good (albeit not necessarily even) loading of the filter medium 11 would continue to be achieved by dividing the air into two paths that move clockwise and counter-clockwise around the passageway 20. As a further example, the size of the passageway 20 may be stepped or decrease in some other non-progressive manner such that, at the very least, the size of the passageway 20 at the ends 21,22 of the passageway 20 is greater than that at the midpoint 23. As a result, better loading may be achieved in comparison to a passageway 20 of constant size. As a yet further example, more even loading of the filter medium 11 may be achieved through changes in the filter medium 11 rather than changes in the size of the passageway 20. For example, the thickness or density of the filter medium 11 may decrease progressively from each end 21,22 to the midpoint 23 of the passageway 20. The filter medium 11 would then be more restrictive at the ends 21,22 and less restrictive at the midpoint 23 of the passageway 20. As a result, the flow rate of air passing through the filter medium 11, and thus the loading of the filter medium 11, would be more even.

Changes in the size of the passageway 20 are achieved through changes in the width of the passageway 20. This then has the advantage that it is not necessary to decrease the height of the passageway 20, which would otherwise decrease the area of the filter medium 11 that is exposed to the air. In spite of this advantage, changes in the size of the passageway 20 could conceivably be achieved in part or in full through changes in the height of the passageway 20.

The frame 10 comprises a single inlet 25 and a pair of ducts 13,14 that connect fluidly the inlet 25 to the ends 21,22 of the passageway 20. This then has the advantage of simplifying the ducting and sealing arrangement between the suction motor 5 and the filter assembly 6. In particular, the suction motor 5 has a single outlet 26 that is coupled to the inlet 25 of the frame 10 by means of a single seal (not shown). Nevertheless, the frame 10 could conceivably comprise two inlets. For example, rather than being attached to one another, the two ducts 13,14 may be detached with each duct 13,14 comprising a distinct inlet. In this instance, the frame 10 would no longer form an enclosed ring but would nevertheless continue to surround the upper part of the suction motor 5.

The inlet 25 in the frame 10 is directed downwardly. As a result, air expelled from the suction motor 5 enters the filter assembly 6 in a vertical direction (i.e. a first direction). The filter assembly 6 is then configured such that the air is turned and passes through the filter medium 11 in a horizontal direction (i.e. a second direction normal to the first direction). This then enables the suction motor 5 and the filter assembly 6 to be mounted within the housing 4 in a relatively compact manner. For example, the outer perimeter of the suction motor 5, when measured in the horizontal plane, is greatest at the centre of the suction motor 5. By configuring the filter assembly 6 in the manner described, it is possible to employ a filter assembly 6 for which the inner perimeter is smaller than the maximum outer perimeter of the suction motor 5, and yet the filter assembly 6 is still able to surround the upper part of the suction motor 5. It will, of course, be appreciated that the inlet 25 may be directed in a different direction according to the locations of the suction motor 5 and the filter assembly 6.

The invention claimed is:

1. A vacuum cleaner comprising a suction motor and a filter assembly, wherein the filter assembly surrounds at least part of the suction motor and comprises a frame to which a filter medium is attached, the filter medium is spaced from a wall of the frame such that an arcuate passageway is defined between the filter medium and the frame, a part of air expelled by the suction motor enters a first end of the passageway and moves around the passageway in a clockwise direction, a further part of air expelled by the suction motor enters a second end of the passageway and moves around the passageway in a counter-clockwise direction, and air within the passageway passes through the filter medium.

2. The vacuum cleaner of claim 1, wherein a size of the passageway at each end of the passageway is greater than that at a midpoint of the passageway.

3. The vacuum cleaner of claim 2, wherein a width of the passageway at each end of the passageway is greater than that at the midpoint of the passageway.

4. The vacuum cleaner of claim 1, wherein a size of the passageway decreases progressively from each end of the passageway to a midpoint of the passageway.

5. The vacuum cleaner of claim 4, wherein a width of the passageway decreases progressively from each end of the passageway to the midpoint of the passageway.

6. The vacuum cleaner of claim 1, wherein the frame comprises an inlet, a first duct that connects fluidly the inlet to the first end of the passageway, and a second duct that connects fluidly the inlet to the second end of the passageway.

7. The vacuum cleaner of claim 1, wherein air expelled from the suction motor enters the filter assembly in a first direction, and air passes through the filter medium in a second direction normal to the first direction.

8. The vacuum cleaner of claim 1, wherein the vacuum cleaner comprises a cable reel unit that surrounds a lower part of the suction motor, and the filter assembly surrounds an upper part of the suction motor.

9. A vacuum cleaner comprising a suction motor and a filter assembly, wherein the filter assembly comprises a frame to which a filter medium is attached, the filter medium is spaced from a wall of the frame such that an arcuate passageway is defined between the filter medium and the frame, a part of air expelled by the suction motor enters a first end of the passageway and moves around the passageway in a clockwise direction, a further part of air expelled by the suction motor enters a second end of the passageway and moves around the passageway in a counter-clockwise direction, the size of the passageway decreases progressively from each end of the passageway to a midpoint of the passageway, and air within the passageway passes through the filter medium.

10. A vacuum cleaner comprising a suction motor and a filter assembly, wherein: the filter assembly surrounds at least part of the suction motor and comprises a frame to which a filter medium is attached; the filter medium is spaced from a wall of the frame such that an arcuate passageway is defined between the filter medium and the frame; the frame comprises an inlet, a first duct that connects fluidly the inlet to a first end of the passageway, and a second duct that connects fluidly the inlet to a second end of the passageway; air expelled by the suction motor enters the inlet and divides with a first part of the air passing through the first duct and a second part of the air passing through the second duct; the first part of the air enters the first end of the passageway and moves around the passageway in a clockwise direction; the second part of the air enters the second end of the passageway and moves around the passageway in a counter-clockwise direction; and air within the passageway passes through the filter medium.

* * * * *